United States Patent [19]

Thompson et al.

[11] 4,368,112
[45] Jan. 11, 1983

[54] SOLVENT RECOVERY FROM FOOTS OIL USING MODIFIED REGENERATED CELLULOSE MEMBRANES

[75] Inventors: John A. Thompson, Wyoming; David H. Shaw, Camlachie, both of Canada; David A. Gudelis, Chatham, N.J.

[73] Assignee: Exxon Research and Engineering Co., Florham Park, N.J.

[21] Appl. No.: 263,115

[22] Filed: May 13, 1981

Related U.S. Application Data

[63] Continuation-in-part of Ser. No. 109,300, Jan. 4, 1980, abandoned, which is a continuation-in-part of Ser. No. 973,967, Dec. 28, 1978, abandoned.

[51] Int. Cl.³ ............................................. C10G 73/08
[52] U.S. Cl. .................................... 208/31; 208/308; 208/321
[58] Field of Search .......................... 208/31, 308, 321

[56] References Cited

U.S. PATENT DOCUMENTS

| | | | |
|---|---|---|---|
| 1,350,532 | 8/1920 | Wait | 210/23 |
| 1,981,758 | 11/1934 | Svanoe | 196/19 |
| 2,761,814 | 9/1956 | Post | 196/17 |
| 2,923,749 | 2/1960 | Lee et al. | 260/674 |
| 2,930,754 | 3/1960 | Stuckey | 210/23 |
| 2,947,687 | 8/1960 | Lee | 210/23 |
| 2,958,656 | 11/1960 | Stuckey | 210/23 |
| 2,958,657 | 11/1960 | Binning et al. | 210/23 |
| 2,960,462 | 11/1960 | Lee et al. | 208/308 |
| 2,970,106 | 1/1961 | Benning et al. | 208/347 |
| 2,985,588 | 5/1961 | Binning et al. | 210/23 |
| 3,043,891 | 7/1962 | Stuckey | 260/674 |
| 3,140,256 | 7/1964 | Martin et al. | 210/23 |
| 3,223,614 | 12/1965 | Paulson | 208/24 |
| 3,225,107 | 12/1965 | Kirkland et al. | 260/652 |
| 3,228,876 | 1/1966 | Mahon | 210/22 |
| 3,370,102 | 2/1968 | Carpenter et al. | 260/674 |
| 3,556,991 | 1/1971 | Gerhold | 208/321 |
| 3,725,525 | 4/1973 | Cavenaghi et al. | 208/331 |
| 4,062,882 | 12/1977 | Sen Gupta | 260/428.5 |
| 4,080,743 | 3/1978 | Manos | 34/9 |
| 4,080,744 | 3/1978 | Manos | 34/9 |
| 4,154,770 | 5/1979 | Kaplan | 585/332 |

FOREIGN PATENT DOCUMENTS

| | | |
|---|---|---|
| 172012 | 2/1923 | United Kingdom . |
| 1032355 | 6/1966 | United Kingdom . |
| 1243507 | 8/1971 | United Kingdom . |
| 1349394 | 4/1974 | United Kingdom . |

OTHER PUBLICATIONS

"Ultrafiltration Through Cellophane of Porosity Adjusted Between Colloidal and Molecular Dimensions", McBain et al., Journal of Physical Chemistry, vol. 40 (1936), pp. 1157–1168.
"Membrane Permeation of Liquids", Symposium on Less Common Separation Methods in Petroleum Industry, Div. Pet. Chem. (ACS) Schrodt, V. N., et al., vol. 6, No. 2, A-29 (1961).
"Regeneration of Used Lubricating Oils by Ultrafiltration", D. Defives et al., Information Chemie #175, pp. 127–131 (1978).
"Reverse Osmosis Separation of Mixtures of Organic Liquids", Sourirajan, Chapter 7, Academic Press 1970.
"Novel Device and Process Design Concepts for a Large Scale Membrane Separation of Hydrocarbon Mixtures", Michaels et al., 7th World Petro. Cong. Proc., vol. 4, p. 21 (1967).
"Progress in Separation and Purification", Perry et al., (editors) Wiley–Interscience, vol. 3, pp. 105–106; 122–124.
"Membrane Process for Effluent Treatment", Pepper Chemistry and Industry, pp. 834–836, Oct. 15, 1977.

Primary Examiner—Howard S. Williams
Assistant Examiner—William Leader
Attorney, Agent, or Firm—Joseph J. Allocca

[57] ABSTRACT

A warm-up deoiling process for lube oil slack wax wherein cold slack wax from a solvent dewaxing operation is warmed up and mixed with solvent to dissolve foots oil contained therein and passed to a rotary drum filter to recover solid wax and a filtrate comprising a solution of foots oil and solvent wherein said filtrate is contacted with one side of a semi-permeable membrane made from regenerated cellulose which selectivity permeates at least a portion of solvent through said membrane and recycling the permeated solvent directly back into the warm-up deoiling operation as part of the solvent mixed with the slack wax.

25 Claims, 2 Drawing Figures

SOLVENT RECOVERY FROM FOOTS OIL USING MODIFIED REGENERATED CELLULOSE MEMBRANES

CROSS-REFERENCE TO RELATED APPLICATIONS

This application is a continuation-in-part of Ser. No. 109,300, filed Jan. 4, 1980 (now abandoned) which is a continuation-in-part of Ser. No. 973,967, filed Dec. 28, 1978 (now abandoned).

BACKGROUND OF THE INVENTION

1. Field of the Invention

This invention relates to an ultrafiltration process for recovering solvent from a foots oil solution. More particularly, this invention relates to a process comprising warming up cold slack wax and mixing it with solvent to dissolve the foots oil and recovering solvent from the foots oil solution by contacting the solution with one side of a semi-permeable membrane made from regenerated cellulose which permeates through at least a portion of the solvent from the foots oil solution.

2. Description of the Prior Art

Warm-up deoiling of lube oil slack wax is wellknown in the art. In such a process the slack wax is warmed up and mixed with solvent to dissolve the foots oil in the slack wax, thereby forming a slurry comprising solid particles of wax and a solution of foots oil and solvent. This slurry is then filtered, usually in a rotary drum filter, to separate the foots oil solution from the solid wax particles as a filtrate. The foots oil-containing filtrate is then sent to solvent recovery operations to recover the solvent from the foots oil solution, with the recovered solvent then recycled back into the warm-up deoiling operation. The prior art solvent recovery is accomplished by thermal means such as passing the solvent-containing oil through a distillation tower or a series of distillation towers and/or evaporation zones in order to boil off the solvent from the oil. Residual amounts of solvent and oil are generally removed therefrom via steam or inert gas stripping. These solvent recovery operations require considerable amounts of thermal energy, pumps, tankage, etc., in order to remove the solvent from the foots oil. It would be an improvement to the art if a warm-up deoiling process could be developed that included a method for separating solvent from the foots oil by relatively low-energy consuming non-thermal means.

It is also well-known in the art to use semipermeable membranes for hydrocarbon separtion processes. Such processes are often referred to as reverse osmosis or ultrafiltration processes. In such processes, the feed, comprising a mixture of at least two different hydrocarbons, is brought into contact with one side of a membrane across which a pressure differential exists, for a period of time sufficient to form two solutions; a permeate which passes through the membrane and a retentate. A useful review of these processes may be found, for example, in an article titled, "Novel Device and Process-Design Concepts For a Large-Scale Membrane Separation of Hydrocarbon Mixtures," by Michaels et al, Seventh World Petroleum Congress Proceedings, v. 4, Page 21 (1967). It is also well-known to use membranes such as various cellulose esters including cellulose acetate, cellulose butyrate, cellulose propionate, etc., as well as cellulose ethers such as ethyl, propyl and amyl cellulose and the like for these processes. U.S. Pat. No. 2,930,754 discloses the use of cellulose ester membranes such as cellulose acetate-butyrate for separating various hydrocarbons such as n-heptane from mixtures of n-heptane and isooctane and toluene from mixtures of toluene and isooctane, using membranes at pressure differentials ranging from about 10-100 psig across the membrane. Where the feed is a mixture of toluene and isooctane, for example, the permeate is richer in toluene while the retentate is richer in isooctane. Using a series of membranes results in substantial separation of one hydrocarbon from the other. U.S. Pat. No. 2,958,657 discloses the use of membranes made of ethyl cellulose for separating hydrocarbons such as n-heptane and isooctane wherein the temperature of the process is sufficiently hot to cause one of the hydrocarbons (in this case isooctane) to vaporize and form an isooctane-rich permeate. That is, the hydrocarbon mixture is present in the feed zone in the liquid phase whereas the permeated hydrocarbons are removed as vapors. U.S. Pat. No. 2,985,588 discloses hydrocarbon separation wherein the rate of permeability across or through the membrane is increased by adjusting the temperature of the process so that it is above the first order transition temperature of the polymeric material comprising the membrane. Membrane materials disclosed in this patent include cellulose triacetate, ethyl cellulose and irradiated polyethylene. U.S. Pat. No. 2,960,462 discloses the use of dual layer membranes for hydrocarbon separation wherein the membrane is a composite of a higher permeation material and a lower permeation material such as cellulose esters and cellulose ethers or cellulose esters and irradiated polyethylene, etc. U.S. Pat. No. 2,958,656 discloses that the rate of selective permeation of hydrocarbons through non-porous cellulose ester and acetate membranes can be increased many fold by contacting the membrane, during permeation, with a non-hydrocarbon solvent material including oxygenated compounds such as alcohols, ethers, alcohol ethers, ketones and chlorinated compounds. Similarly, U.S. Pat. No. 2,947,687 discloses that the permeation rate through a non-porous, semi-permeable cellulose ester membrane may be improved by contacting the membrane, during the permeation process, with a substituted hydrocarbon which is soluble in and has solvent power for the membrane. Still further, U.S. Pat. No. 3,043,891 discloses a similar process and achieves a similar purpose by using aromatic and unsaturated nonoxygenated solvents. Unfortunately, adding a membrane solvent to the feed causes the membrane to soften and become very weak which often results in membrane rupture. Thus, U.S. Pat. No. 2,923,749 discloses adding saturated hydrocarbons to the feed mixture in order to act as a diluent thereby permitting increased permeation through the membrane at a lower temperature or pressure at the expense of membrane solubility. It is also important to note that all of these prior art processes maintain a vacuum on the permeate side of the membrane so that the permeate is removed as a vapor.

Thus, it has generally been concluded that cellulose acetate membranes are not, in general, suitable for organic feed mixtures, even though they appear good enough for other (i.e., aqueous separations) applications (c.f., *Reverse Osmosis* by Sourirajan, Chapter 7, Academic press, 1970). In *Membrane Processes for Effluent Treatment* by D. Pepper, Chemistry and Industry, Pages 834–836 (Oct. 15, 1977), it is stated that commercially used reverse osmosis membranes are usually made from cellulose acetate or polyamide. Finally, the French have used acrylonitrile copolymer membranes in a reverse osmosis process for the ultrafiltration removal of impurities from used motor oils as disclosed in an article titled, "Regeneration of Used Lubricating Oils by Ultra-Filtration," by D. Defives et al, Information Chimie, No. 175, Pages 127–131 (March, 1978). This article also states that if these acrylonitrile copolymer membranes are used in the presence of a solvent immiscible with water, such as a hydrocarbon solvent or oil, they are not wetted and are thus impermeable to the hydrocarbon. In order to function in a non-aqueous medium, the article states that the membranes must be conditioned by using a solvent that is both miscible with water and with the solvent under consideration, such as acetone or a low molecular weight alcohol. However, it was found that if the oil contained a sufficient amount of surface-active agents and was under sufficient pressure, the oil succeeded in progressively wetting the moist membranes, thus eliminating the solvent conditioning required on a laboratory scale.

Interestingly, it has been stated with authority that the most useful membranes to convert for use with organic liquids are cellulose membranes, but that cellulose acetate or cellulose nitrate membranes are soluble in too large a variety of organic solvents to be useful. *Progress in Separation and Purification*, v. 3, Perry and VanOss, eds., Pages 105–106; 122–124 (Wiley-Interscience, 1970). This reference states that in order to impregnate a hydrophilic membrane with a water-immiscible liquid, the membrane has to be soaked in a series of successive baths of the following composition: 30% water-70% ethanol, 5% water-45% ethanol-50% butanol, 100% butanol (renewed 3 times), 70% butanol-30% oil, 30% butanol-70% oil, 100% oil. Cellophane as such could not be impregnated with any non-aqueous liquid that was tried unless it was first treated with concentrated $ZnCl_2$. Unfortunately, this treatment destroys the membrane selectivity required for many hydrocarbon separations.

Therefore, because regenerated cellulose or cellophane membranes are not soluble in solvents uses for dewaxing hydrocarbon oils such as lube oils, are relatively low in cost, are readily available and relatively high in strength, it would be an improvement to the art if a lube oil slack wax warm-up deoiling process could incorporate the use of these membranes to separate solvent from the foots oil solution produced in such a process.

SUMMARY OF THE INVENTION

The present invention is a process comprising warming up cold slack wax and mixing it with solvent to dissolve the foots oil contained therein to form a slurry comprising solid particles of wax and a solution of foots oil and solvent, separating the solid wax from the foots oil-containing solution and contacting the solution with one side of a semi-permeable membrane made from regenerated cellulose that selectively permeates at least a portion of the solvent from the solution to form a permeate richer in solvent and a retentate leaner in solvent than said solution. It is understood that the slack wax is obtained by solvent dewaxing a waxy lube oil stock which produces a slurry comprising solid particles of wax and a mixture of dewaxed oil and solvent. This slurry is sent to solid-liquid separation means, such as a rotary drum filter, wherein the wax is deposited on the filter drum as a wax cake and the solution of dewaxed oil and solvent removed from the filter as a filtrate. The wax cake is washed with solvent while on the filter drum. The washed wax cake removed from the filter drum is known as "slack wax." This slack wax contains significant amounts of wax or waxy oil having a melting point broadly ranging from about 30° F. to 80° F. which is referred to in the art as "foots oil." It is necessary to remove the foots oil from the slack wax in order to produce a higher quality wax product having a higher melting point.

By semi-permeable it is meant that the membrane selectively permeates the solvent from a solvent-containing foots oil solution.

The term "regenerated cellulose" describes cellulose which has been dissolved by virtue of the production of a soluble chemical derivative, such as cellulose xanthate, or cuprammonium cellulose and subsequently reprecipitated. When prepared as a fiber, regenerated cellulose is commonly known as "viscose rayon." As a film, regenerated cellulose is known by the generic term "cellophane." Thus, the regenerated cellulose film (or cellophane) membranes useful in this invention do not include the relatively solvent soluble cellulose ether and cellulose ester membranes described under the Prior Art, supra, which have not met with commercial success for hydrocarbon separations. The regenerated cellulose film, also known as cellophane, membranes useful in this invention are commercially available, as hydrophilic membranes, from various companies for various aqueous ultrafiltration processes and are normally supplied containing a glycol such as glycerol. The glycerol is present as a humectant in order to prevent drying out of the membrane. If the membrane is allowed to dry out, its internal cell structure irreversibly collapses, thereby rendering the membrane useless for ultrafiltration and reverse osmosis processes. If the membrane contains or is coated with a glycol or other humectant, the glycol must be removed first. This may be done simply by soaking the membrane in water at room temperature in order to swell the membrane and to displace the entrained glycol. The watercontaining membrane must then be converted or modified into a semi-permeable membrane useful in the process of this invention. It is to be understood, that at no time must the membrane be allowed to dry out whether it contains water or a solvent or other liquid.

For obtaining rapid selective permeation, a thin membrane is employed which, in general, will be less than about 10 mils, preferably less than 5 and still more preferably no greater than 2 mils in thickness. The membrane employed should be free from holes and other defects which would destroy its semi-permeable nature. If the membrane has pinholes or the like, this will permit all of the oil and solvent to leak through, thereby reducing or even eliminating the selectivity of the membrane.

The hydrophilic regenerated cellulose film membrane (cellophane) may be converted to a semi-permeable membrane useful in this invention by a process substantially claimed and described in copending U.S. patent application Ser. No. 263,116 which is a continuation-in-part of U.S. Ser. No. 109,559 filed Jan. 4, 1980 (now abandoned) which is a continuation-in-part of U.S. Ser. No. 974,078 filed Dec. 28, 1978 (now abandoned), which process comprises sequentially permeating the water-containing membrane with a series of solvents of decreasing polarity, under pressure, beginning with a low molecular weight alcohol or ketone which is miscible with water (bulk miscibility) and ending with a solvent miscible (bulk miscibility) with both the higher polarity solvent immediately preceeding it and the organic material or solvent desired to be permeated through the membrane. None of the solvents employed should be concentrated aqueous $ZnCl_2$ solutions, as the use of concentrated, aqueous $ZnCl_2$ solutions destroys the membrane selectivity required for many hydrocarbon separations. It is preferred that the final solvent permeated through during the conversion treatment be of a size and shape similar to the material to be selectively permeated. It is also understood, of course, that none of the materials permeated through the membrane should react with, dissolve or otherwise adversely affect the membrane.

This may be more readily understood by the following sequential treatment used to convert a glycerol-containing regenerated cellulose membrane to a membrane capable of selectively separating MEK (methyl ethyl ketone) from a lube oil/MEK solution:

a. water soak membrane to swell same and displace the glycerine;

b. permeate methanol through the water-containing membrane under pressure (i.e., 200–400 psi); and c. permeate MEK through the methanol-containing membrane under pressure (i.e., 200–400 psi).

A membrane modified by this treating sequence (water-methanol-MEK) will also selectively permeate toluene or a mixture of MEK/toluene from an oil containing toluene or a mixture of MEK/toluene, respectively. Another illustrative, but nonlimiting example is for the case where it is desired to separate propane from a dewaxed group oil stock. To do this, step c above can be followed by permeation of propane under pressure. However, propane will not permeate through the membrane if step c is omitted. Thus, the sequence water-methanol-propane will not work. The sequence water-methanol-toluene-propane will work as will the sequence water-methanol-MEK-pentane-propane. Although it is preferred to follow the pentane permeation step with a propane permeation step, the propane permeation step can be accomplished in situ by using the oil/propane solution that one desires to remove the propane from. Thus, it should also be noted that the final solvent permeated through the membrane can be done in situ by contacting the membrane with a foots oil solution containing said solvent (i.e., if it is desired to permeate MEK or a mixture of MEK/toluene, step c above can be accomplished by contacting the membrane with a foots oil solution containing said solvent).

As has heretofore been stated, the first treating solvent permeated through the water-containing membranes is selected from the group consisting essentially of (a) one or more low molecular weight one to four carbon atom alcohols and (b) acetone or mixture thereof, said solvent exhibiting bulk liquid-liquid miscibility with water. Illustrative materials include methanol, ethanol, isopropanol, propanol, sec-butanol, isobutanol and acetone. Particularly preferred are the one to three carbon atom alcohols.

The treating solvents must be permeated through the membrane at a differential pressure across the membrane in order to displace the water from same. This pressure may range from about 100 to 800 psi or more. The maximum pressure should be somewhat less than the crushing pressure of the membrane while the practical lower pressure limit is controlled by that pressure needed to displace the material from the membrane. By way of example, the minimum pressure for water is about 100 psi. For MEK, the minimum pressure is also about 100 psi. Preferred are pressure differentials across the membrane ranging from about 150–800 psi, while from about 200–400 psi is particularly preferred. The second, successive solvent to be permeated through the membrane must be less polar than the exhibit bulk liquid-liquid miscibility with the first solvent and be more polar than and exhibit bulk liquid-liquid miscibility with the third solvent or material to be permeated. Thus, the solvent treatment sequentially progresses with solvents of continuously decreasing polarity wherein there is bulk liquid-liquid miscibility between any two adjacent solvents in the sequential series. An illustrative but non-limiting example of solvent polarity is illustrated in Table 1 which lists a number of solvents of decreasing polarity as a function of dielectric constant. The lower the dielectric constant, the less polar is the solvent.

TABLE 1

DIELECTRIC CONSTANT OF SOLVENTS
in Order of Decreasing Polarity

| Solvent | Dielectric Constant, $\epsilon$ | Temperature, °C. |
|---|---|---|
| Water | 80.4 | 25 |
| Methanol | 32.6 | 25 |
| Ethanol | 24.3 | 25 |
| Propanol | 20.1 | 25 |
| MEK | 18.5 | 20 |
| MIBK | 15.4 | 20 |
| Decanol | 8.1 | 20 |
| Ethyl Acetate | 6.0 | 25 |
| Chloroform | 4.8 | 20 |
| Ethyl Ether | 4.3 | 20 |
| Toluene | 2.4 | 25 |
| Carbon Tetrachloride | 2.2 | 20 |
| Pentane | 1.8 | 20 |
| Propane | 1.6 | 0 |

As has heretofore been stated, supra, regenerated cellulose membranes useful for ultrafiltration processes are commercially available from a number of suppliers. These membranes are sold in terms of molecular weight cut-off ranges or equivalent "pore size." The pore size of a semi-permeable membrane cannot be categorically stated for many reasons. Pore size may be too small to be measured by physical methods. Pore sizes change with temperature and with each solvent saturated within the membrane due to swelling or shrinkage, etc. A common approach used in the industry is to distinguish solvents too large to diffuse through the membrane from those small enough to diffuse through it. This can be accomplished using a membrane "sizing" kit. A list of twelve standard compounds used to "size" membranes is shown in Table 2. These compounds are roughly spherical in shape. The molecular weight cut-off is quoted as the formula weight of the compound which is 98% retained by the membrane. Thus, a regenerated cellulose membrane sold as having a molecular weight cut-off of from between about 6000 to 8000 will, in general, not permit permeation of generally spherical protein molecules having a molecular weight exceeding from about 6,000 to 8,000. Thus, one must select that membrane having a pore size such that it will provide the desired selectivity after treatment. While not wishing to be held to any theory, it is believed that the solvent treatment of this invention alters the so-called "pore size." By way of illustration, it is believed a regenerated cellulose membrane having a molecular weight cut-off of from about 6,000 to about 8,000, has a pore size having a diameter of roughly about 24 A.

After treatment with the solvent series water-methanol-MEK, the pore size it is believed to shrink to a diameter of roughly about 12 A.

TABLE 2
COMPOUNDS FOR SIZING MEMBRANES

| Compound | Formula Weight | Diameter A |
|---|---|---|
| Urea | 60 | 5.4 |
| Glucose | 180 | 7.2 |
| Sucrose | 312 | 8.8 |
| Raffinose | 504 | 11.2 |
| Salmine | 6,000 | 24.0 |
| Cytochrome C | 12,000 | 25.0 |
| Lysozyme | 14,000 | 31 |
| Myoglobin | 17,000 | 43 |
| Chymotrypsinogen | 25,000 | 40 |
| Hemoglobin | 67,000 | 55 |
| APO Ferritin | 480,000 | 61 |
| Albumin | 67,000 | 145 × 50 × 22 |

Any solvent useful for dewaxing waxy petroleum oils may be used in the process of this invention. In most cases, it is preferred to use the same solvent for dissolving the foots oil that was used in the dewaxing process. Representative examples of such solvents are (a) the aliphatic ketones having from 3 to 6 carbon atoms, such as acetone, methyl ethyl ketone (MEK) and methyl isobutyl ketone (MIBK), and (b) low molecular weight autorefrigerant hydrocarbons, such as ethane, propane, butane and propylene, as well as mixtures of the foregoing and mixtures of the aforesaid ketones and/or hydrocarbons with aromatics such as benzene, xylene and toluene. In addition, halogenated, low molecular weight hydrocarbons such as the $C_1$-$C_4$ chlorinated hydrocarbons, e.g., dichloromethane, dichloroethane and mixtures thereof, may be used as solvents either alone or in admixture with any of the aforementioned solvents.

The foots oil-containing slack wax may be obtained from dewaxing any waxy petroleum oil stock or distillate fraction thereof. Illustrative, but non-limiting examples of such stocks are (a) distillate fractions that have a boiling range within the broad range of about 500° F. to about 1300° F., with preferred stocks including the lubricating oil and specialty oil fractions boiling within the range of between about 550° F. and 1200° F., (b) bright stocks and deasphalted resids having an initial boiling point above about 800° F. and (c) broad cut feed stocks that are produced by topping or distilling the lightest material off a crude oil leaving a broad cut oil, the major portion of which boils above about 500° F. or 650° F. Additionally, any of these feeds may be hydrocracked prior to distilling, dewaxing or topping. The distillate fractions may come from any source such as the paraffinic crudes obtained from Aramco, Kuwait, the Pan Handle, North Louisiana, etc., naphthenic crudes, such as Tia Juana, Coastal crudes, etc., as well as the relatively heavy feed stocks, such as bright stocks having a boiling range of 1050+° F. and synthetic feed stocks derived from Athabasca Tar Sands, etc.

DETAILED DESCRIPTION

Figure 2:
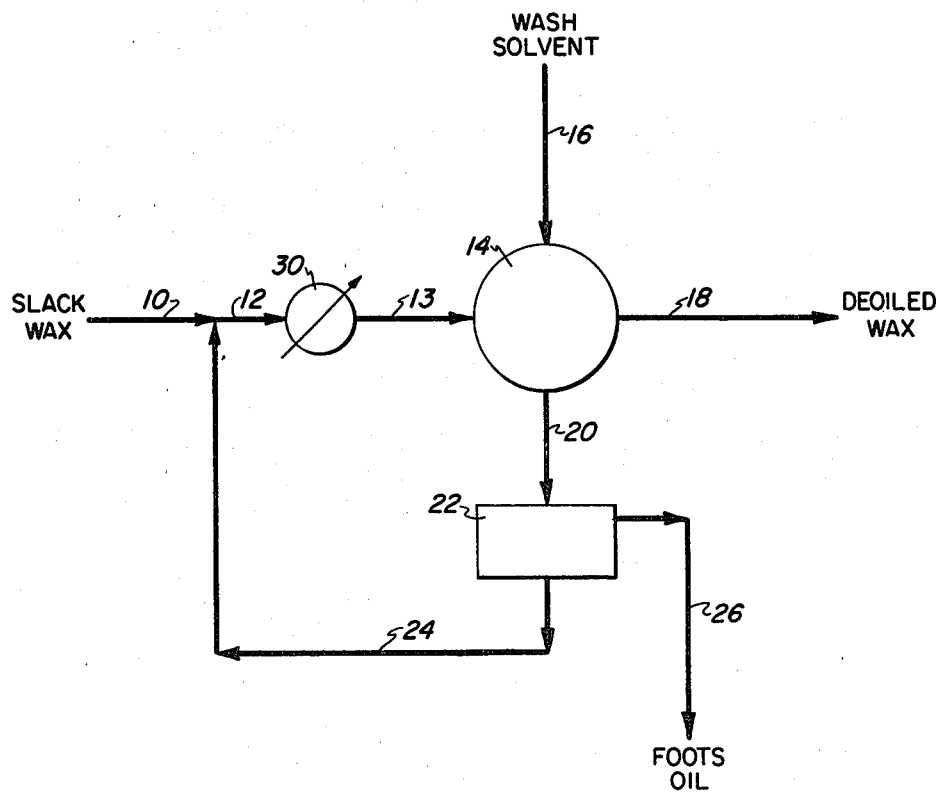
FIG. 2 illustrates an embodiment of the process of this invention.

Referring to FIG. 2, a solvent-containing slack wax, at a temperature of about 0° F., is withdrawn from a lube oil wax filter (not shown) via line 10. The solvent-containing slack wax stream contains foots oil having a melting point of about 70° F. and comprises about 25 LV% (liquid volume) of oily wax and 75 LV% of a 30/70 volume mixture of MEK/MIBK. The solvent-containing slack wax stream in line 10 is mixed with permeate solvent from line 24 in an amount of about one volume of permeate solvent per volume of solvent-containing slack wax. The permeate solvent is a 30/70 volume mixture of MEK/MIBK, at a temperature of about 70° F., which is withdrawn and recycled from membrane unit 22. Alternatively, the solvent can be added after heat exchanger 30. The mixture of slack wax and permeate solvent is passed to heat exchanger 30 via line 12 wherein it is warmed up to a temperature of about 70° F. which dissolves the foots oil, but not the wax, to produce a slurry comprising solid particles of wax and a solution of foots oil. This slurry is passed to wax filter 14 via line 13 wherein the solid wax is separated from the foots oil solution. Filter 14 is a rotary drum filter wherein the solid wax is deposited on a rotating drum (not shown) in the form of a wax cake which is solvent washed on the drum. The wash solvent comprises a 30/70 volume mixture of MEK/MIBK, at a temperature of about 70° F., which enters filter 14 via line 16. One volume of wash solvent is used for each three volumes of slurry entering the wax filter 14. The deoiled, washed wax is then removed from the filter via line 18. Approximately one volume of deoiled wax cake is produced for every six volumes of slurry entering the filter and the wax cake comprises approximately 30 volume % wax and 70 volume % solvent. In the wax filter the foots oil solution is separated from the deoiled wax as a foots oil filtrate. The wash solvent forms a wash filtrate. The foots oil and wash filtrates are combined in the filter and passed to membrane unit 22 via line 20. Membrane unit 22 contains a plurality of modified, semi-permeable membrane made from regenerated cellulose which preferentially permeates therethrough solvent from the combined filtrate to form a permeate richer in solvent and a retentate leaner in solvent than the combined filtrate feed fed to the unit. In membrane unit 22, the combined filtrate contacts one side of said membranes, at a temperature of about 70° F. and under a differential pressure across the membranes of about 400 psi. Each two volumes of combined filtrate entering the membrane unit produces one volume of permeate containing from about 1-3 volume % of foots oil and one volume of retentate containing about 15 volume % foots oil. The permeate is removed from the unit via line 24 and recycled back into the warm-up deoiling process. The retentate may be sent to further processing to separate the solvent from the foots oil. The further processing may comprise membrane and/or thermal separation means. It is to be understood that membrane unit 22 is intended to include at least one unit containing a plurality of said modified membranes arranged in parallel and/or series configurations. A plurality of membrane units may be employed in the process of this invention.

EXAMPLE

The invention will be more readily understood by reference to the following example.

Figure 1:
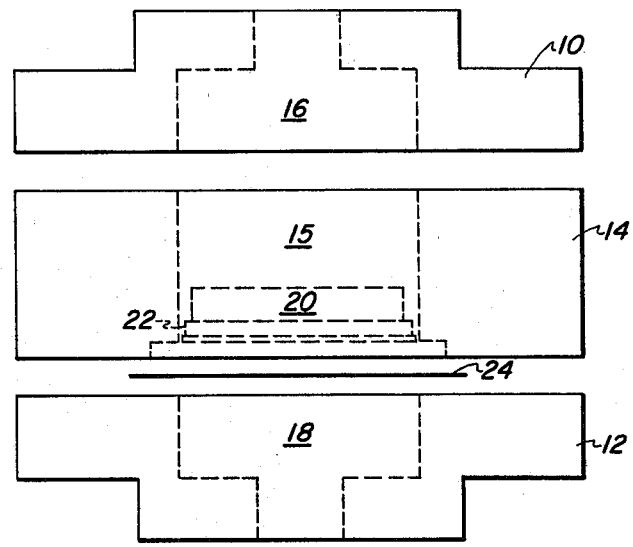
FIG. 1 schematically illustrates a laboratory apparatus used in the examples of this invention.

Referring to FIG. 1, the laboratory apparatus used was a Millipore holder defined by top 10 and bottom 12 and containing spacer 14 to define liquid spaces 16 and 18 for the feed and permeate, respectively. Spacer 14 contains a teflon-coated, star-shaped magnetic stirrer 20 separated from membrane 24 which is clamped between spacer 14 and millipore bottom 12. Magnetic support 22 is porous, is approximately 1/10 inches thick and merely serves to prevent magnetic stirrer 20 from abrading membrane 24. The teflon-coated, star-shaped magnetic stirrer is rotated by means not shown in order to prevent or minimize the boundary layer on the feed side of membrane 24. In operation, the feed liquid is introduced under pressure into liquid space 16 and one or more components of the feed selectively permeates through membrane 24 to form a permeate in liquid space 18. The permeate is continuously removed from the apparatus and analyzed. When used as a batch apparatus, the retentate is that material which did not permeate through the membrane and which has a composition different from both the feed and permeate.

In this experiment the apparatus heretofore described was used along with a Spectrum Medical Industries regenerated cellulose membrane designated as Spectrapor 3500 having a molecular weight cut-off (MWCO) of 3500 and a nominal thickness of 0.002 inches which was pretreated by soaking in water to remove the glycerine, followed by a sequential solvent permeation of methanol and MEK under a pressure of 400 psi at room temperature. The apparatus was charged with a feed comprising a 5 LV% solution of a foots oil, having a melting point of about 70° F., in a 45/55 volume solution of MEK/MIBK. The feed contacted the membrane under a pressure of 400 psig and at a temperature of 122° F. At 50% permeation, the permeate comprised a mixture of about 99 LV% solvent and 1 LV% foots oil.

COMPARATIVE EXAMPLE

A sample of regenerated cellulose membrane having a molecular weight cut off of 12,000 was pretreated by exposure to a series of solvents of decreasing polarity which exhibited bulk liquid-liquid miscibility one with the other as described in the present invention. Separate samples of the same material were similarly treated but further involved an initial exposure to either a concentrated aqueous $ZnCl_2$ solution or a concentrated alcoholic $ZnCl_2$ solution to determine the effect of such treatment on separation selectivity. The thus treated membrane samples were then employed to separate an oil/MEK mixture (19.6 wt. % 600 N oil in pure MEK). The pretreatment procedures and the results of oil/MEK separation are presented below. In the pretreatment procedure, each water soak was for 5 minutes. The aqueous $ZnCl_2$ solution was 68–64 wt. % $ZnCl_2$ in $H_2O$ at 23° C. The concentrated aqueous $ZnCl_2$ soak was for 15 minutes. It was observed that soaking the membrane in the concentrated aqueous $ZnCl_2$ solution for 30 minutes dissolved the membrane. The use of concentrated alcoholic $ZnCl_2$ solution (46 wt. % $ZnCl_2$ in methanol at 23° C.) at permeation times of 15 and 90 minutes had very little adverse effect on solvent flux rate, permeate flux rate and permeate oil content as compared with the pretreatment procedure employing no $ZnCl_2$ solution at all. All flux rates were measured at 400 psig at 23° C. As can be seen Run No. 2, which employed the additional pretreatment step of initial exposure of the membrane to concentrated aqueous $ZnCl_2$ exhibited a very high ketone flux, permeate flux and very little selectivity for the separation of oil from ketone. Runs 1, 3 and 4 all exhibited good oil from ketone separation selectivity.

TABLE

EFFECT OF $ZnCl_2$ SOLUTIONS ON R.C. MEMBRANE
Membrane: Regenerated Cellulose (12000 MWCO)
Feed: 19.6 wt. % 600N oil in pure MEK

| Run No. | 1 | 2 | 3 | 4 |
|---|---|---|---|---|
| Precondition Steps | water soak methanol permeation<br><br>MEK permeation<br><br><br><br><br><br>oil/ketone permeation | water soak sat'd $ZnCl_2$ in $H_2O$ soak (15 minutes)<br>water wash<br><br><br><br>methanol permeation<br>MEK permeation<br>oil/ketone permeation | water soak methanol permeation<br><br>sat'd $ZnCl_2$ in methanol permeation (15 minutes)<br>methanol permeation<br>MEK permeation<br>oil/ketone permeation | water soak methanol permeation<br><br>sat'd $ZnCl_2$ in methanol permeation (90 minutes)<br>methanol permeation<br>MEK permeation<br>oil/ketone permeation |
| MEK Flux, $1/m^2/d$ | 660 | 36000 | 1028 | 900 |
| Permeate Flux $1/m^2/d$ | 110 | 19200 | 95 | 78 |
| Permeate Oil Content (wt. %) | 7.8 | 18.7 | 8.5 | 9.4 |

What is claimed is:
1. A process comprising:
   (a) warming up a mixture of foots oil containing slack wax and solvent to dissolve at least a portion of the foots oil to form a slurry comprising solid particles of wax and a solution of foots oil and solvent;
   (b) passing said warm slurry to solid-liquid separation means to separate the solid particles of wax from the foots oil solution; and
   (c) contacting at least a portion of said foots oil solution, under pressure, with one side of at least one semi-permeable membrane made from regenerated cellulose film to form a permeate richer in said solvent than said mixture and a retentate leaner in said solvent than said solvent than said mixture, wherein said semipermeable membrane is prepared from a water-containing hydrophilic regenerated cellulose membrane by sequentially permeating through said water-containing membrane, under a differential pressure across the membrane, a series of solvents of decreasing polarity wherein adjacent solvents in the series exhibit bulk liquid-liquid miscibility with each other and wherein the last solvent exhibits bulk liquid-liquid miscibility with the dewaxing solvent to be permeated through the membrane.

2. The process of claim 1 wherein the first membrane-treating solvent is selected from the group consisting essentially of one to four carbon atom alcohols, acetone and mixtures thereof which exhibit bulk liquid-liquid miscibility with water.

3. The process of claim 1 wherein said membrane-treating differential pressure ranges from about 100 to 800 psi.

4. The process of claim 3 wherein said membrane is less than about 10 mils thick.

5. The process of claim 1 wherein said final solvent permeated through said membrane comprises at least one solvent component of said foots oil solutions.

6. The process of claim 5 wherein said final solvent is permeated through said membrane in situ by contacting said membrane with said foots oil solution.

7. The process of claim 5 or 6 wherein the final solvent component is an aliphatic ketone having from 3 to 6 carbon atoms or low molecular weight auto-refrigerant hydrocarbons or aromatics or low molecular weight halogenated hydrocarbons or mixtures thereof.

8. The process of claim 7 wherein the final solvent component is methyl ethyl ketone, methyl isobutyl ketone and mixtures thereof.

9. The process of claim 7 wherein the final solvent component is propane.

10. A process comprising:
(a) warming up a mixture of foots oil containing slack wax and solvent to dissolve at least a portion of the foots oil to form a slurry comprising solid particles of wax and a solution of foots oil and solvent;
(b) passing said warm slurry to solid-liquid separation means to separate the solid particles of wax from the foots oil solution; and
(c) contacting at least a portion of said foots oil solution with one side of at least one semi-permeable membrane made from regenerated cellulose film at a differential pressure across said membrane ranging from about 100 to 800 psi wherein said membrane preferentially permeates at least a portion of said solvent through said membrane to form a permeate richer in said solvent and a retentate leaner in said solvent than said foots oil solution, wherein said semi-permeable membrane is prepared from a water containing hydrophilic membrane by sequentially permeating through said water-containing membrane, under a differential pressure across the membrane, a series of solvents of decreasing polarity wherein adjacent solvents in the series exhibit bulk liquid-liquid miscibility with each other and wherein the last solvent exhibits bulk liquid-liquid miscibility with the solvent to be permeated through the membrane.

11. The process of claim 10 wherein the first membrane-treating solvent is selected from the group consisting essentially of one to four carbon atom alcohols, acetone and mixtures thereof which exhibit bulk liquid-liquid miscibility with water under a differential pressure across the membrane ranging from about 100 to 800 psi.

12. The process of claim 10 wherein said membrane is less than about 10 mils thick.

13. The process of claim 10 wherein said final solvent permeated through said membrane comprises at least one solvent component of said foots oil solution.

14. The process of claim 13 wherein said final solvent is permeated through said membrane in situ by contacting said membrane with said foots oil solution.

15. The process of claim 13 or 14 wherein the final solvent component is an aliphatic ketone having from 3 to 6 carbon atoms or low molecular weight autorefrigerant hydrocarbons or aromatics or low molecular wieght halogenated hydrocarbons or mixtures thereof.

16. The process of claim 15 wherein the final solvent component is methyl ethyl ketone, methyl isobuty ketone and mixtures thereof.

17. The process of claim 15 wherein the final solvent component is propane.

18. A process comprising:
(a) mixing a foots oil containing slack wax with a solvent;
(b) warming said mixture to dissolve at least a portion of the foots oil in said solvent to form a slurry comprising solid particles of wax and a solution of foots oil; and
(c) passing said warm slurry to a wax filter to separate said solid wax from said foots oil solution;
(d) contacting said foots oil solution with one side of a plurality of semi-permeable membranes made from regenerated cellulose film at a differential pressure across said membranes ranging from about 100 to 800 psi, said membranes preferentially permeating at least a portion of said solvent therethrough to form a permeate richer in said solvent and an oil-rich retentate leaner in said solvent than said solution, wherein each of said semi-permeable membranes is prepared from a water-containing hydrophilic membrane by sequentially permeating through a water-containing membrane, under a differential pressure across the membrane, a series of solvents of decreasing polarity wherein adjacent solvents in the series exhibit buld liquid-liquid miscibility with each other and wherein the last solvent exhibits bulk liquid-liquid miscibility with the solvent to be permeated through the membrane; and
(e) recycling at least a portion of said permeate back to step (a) wherein it is mixed with said slack wax.

19. The process of claim 18 wherein the first membrane-testing solvent is selected from the group consisting essentially of one to four carbon atom alcohols, acetone and mixtures thereof which exhibit bulk liquid-liquid miscibility with water, under a differential pressure across the membrane ranging from about 100 to 800 psi.

20. The process of claim 18 wherein said membrane is less than about 10 mils thick.

21. The process of claim 18 wherein said final solvent permeated through said membrane comprises at least one solvent component of said foots oil solution.

22. The process of claim 21 wherein said final solvent is permeated through said membrane in situ by contacting said membrane with said foots oil solution.

23. The process of claim 21 or 22 wherein the final solvent component is an aliphatic ketone having from 3 to 6 carbon atoms, or low molecular weight autorefrigerant hydrocarbons or aromatics or low molecular weight halogenated hydrocarbons or mixtures thereof.

24. The process of claim 23 wherein the final solvent component is methyl ethyl ketone, methyl isobutyl ketone and mixtures thereof.

25. The process of claim 23 wherein the final solvent component is propane.

* * * * *